(12) United States Patent
Eckert

(10) Patent No.: US 10,368,622 B1
(45) Date of Patent: Aug. 6, 2019

(54) GLARE SHIELD FOR A MOBILE TELEPHONE

(71) Applicant: Francis J. Eckert, Edison, NJ (US)

(72) Inventor: Francis J. Eckert, Edison, NJ (US)

( * ) Notice: Subject to any disclaimer, the term of this patent is extended or adjusted under 35 U.S.C. 154(b) by 0 days.

(21) Appl. No.: 15/979,832

(22) Filed: May 15, 2018

(51) Int. Cl.
*G06F 1/16* (2006.01)
*A45C 13/00* (2006.01)
*A45C 11/00* (2006.01)
*H04M 1/02* (2006.01)

(52) U.S. Cl.
CPC ............ *A45C 13/001* (2013.01); *A45C 11/00* (2013.01); *A45C 2011/002* (2013.01); *H04M 1/0202* (2013.01)

(58) Field of Classification Search
CPC .... G06F 1/1603; G06F 1/1628; G06F 1/1656; A45C 2011/002; A45C 13/004; A45B 2023/0093
USPC ......................................................... 224/197
See application file for complete search history.

(56) References Cited

U.S. PATENT DOCUMENTS

| | | | | |
|---|---|---|---|---|
| 4,044,933 | A * | 8/1977 | Artz ........................ | A45C 11/38 224/666 |
| 5,508,757 | A * | 4/1996 | Chen ........................ | H04N 5/65 348/818 |
| 5,717,566 | A * | 2/1998 | Tao ........................ | G06F 1/1603 348/834 |
| 5,988,823 | A | 11/1999 | Wong | |
| 6,144,419 | A | 11/2000 | Schmidt | |
| 6,302,546 | B1 | 10/2001 | Kordiak | |
| 6,419,367 | B1 * | 7/2002 | Dion ........................ | G02B 5/003 348/834 |
| 8,070,026 | B2 * | 12/2011 | Wadsworth ............ | A45C 11/00 224/197 |
| 8,231,038 | B2 * | 7/2012 | Felts ........................ | A45F 5/02 224/665 |
| 9,027,814 | B2 * | 5/2015 | Tages ..................... | A45F 5/021 224/666 |
| 9,351,415 | B2 * | 5/2016 | Zaccaria ............... | A45C 7/0036 |
| 9,596,332 | B2 * | 3/2017 | Gander ................... | A45F 5/00 |
| 2006/0279916 | A1 | 12/2006 | Boudreau | |
| 2011/0303579 | A1 * | 12/2011 | Sanders ................... | A45F 5/00 206/701 |
| 2013/0229715 | A1 | 9/2013 | Allen | |
| 2014/0375901 | A1 * | 12/2014 | Stockett ................... | H04N 5/64 348/838 |
| 2015/0053581 | A1 * | 2/2015 | Miller ..................... | A45C 11/00 206/320 |

(Continued)

OTHER PUBLICATIONS

TFY Universal Phone Sun Shade & Glare Visor Shield for iPhone 8 / 6 / 6S / 7—Samsung Galaxy S6 S6 edge S7 and Other 4.5 Inch to 5.2 Inch Smartphones. Product listing [online]. © 1996-2018, Amazon.com, Inc. [retrived on Jun. 1, 2017]. Retrieved on the Internet: <URL: https://www.amazon.com/dp/B01DNRA35S>.

*Primary Examiner* — Adam J Waggenspack
(74) *Attorney, Agent, or Firm* — Cramer Patent & Design, PLLC; Aaron R. Cramer

(57) ABSTRACT

A glare shield includes a structure having an open face which is capable of fitting about a rear side surface of a mobile telephone. A plurality of apertures is configured to accommodate power jacks, earphone jacks, volume buttons, power switches, control switches, and such devices commonly associate with the mobile telephone. The glare shield is foldable and also incorporates a deployable stand.

11 Claims, 16 Drawing Sheets

(56) References Cited

U.S. PATENT DOCUMENTS

2016/0021998 A1\* 1/2016 Fathollahi ............. A45C 11/00
                                                                         224/191

\* cited by examiner

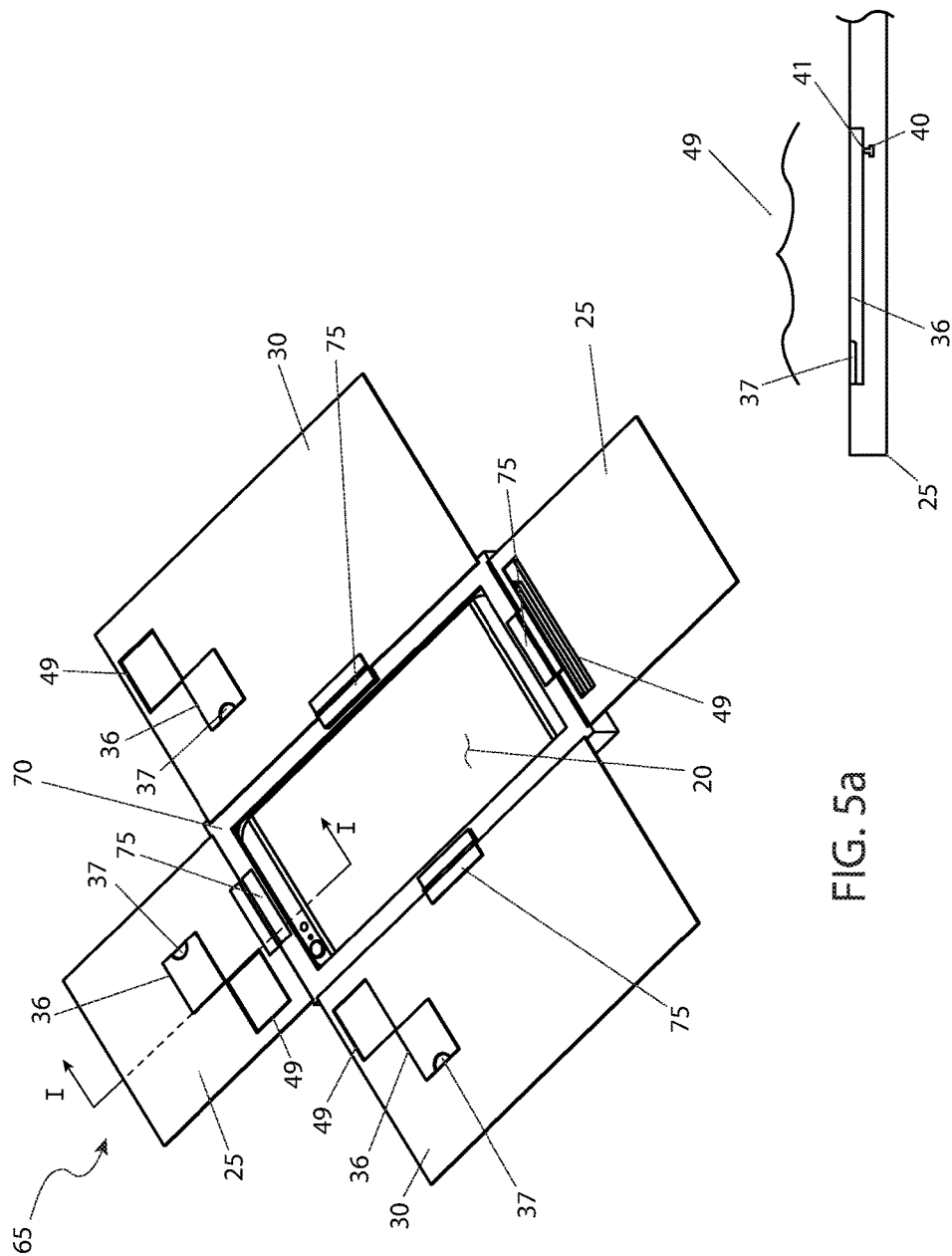

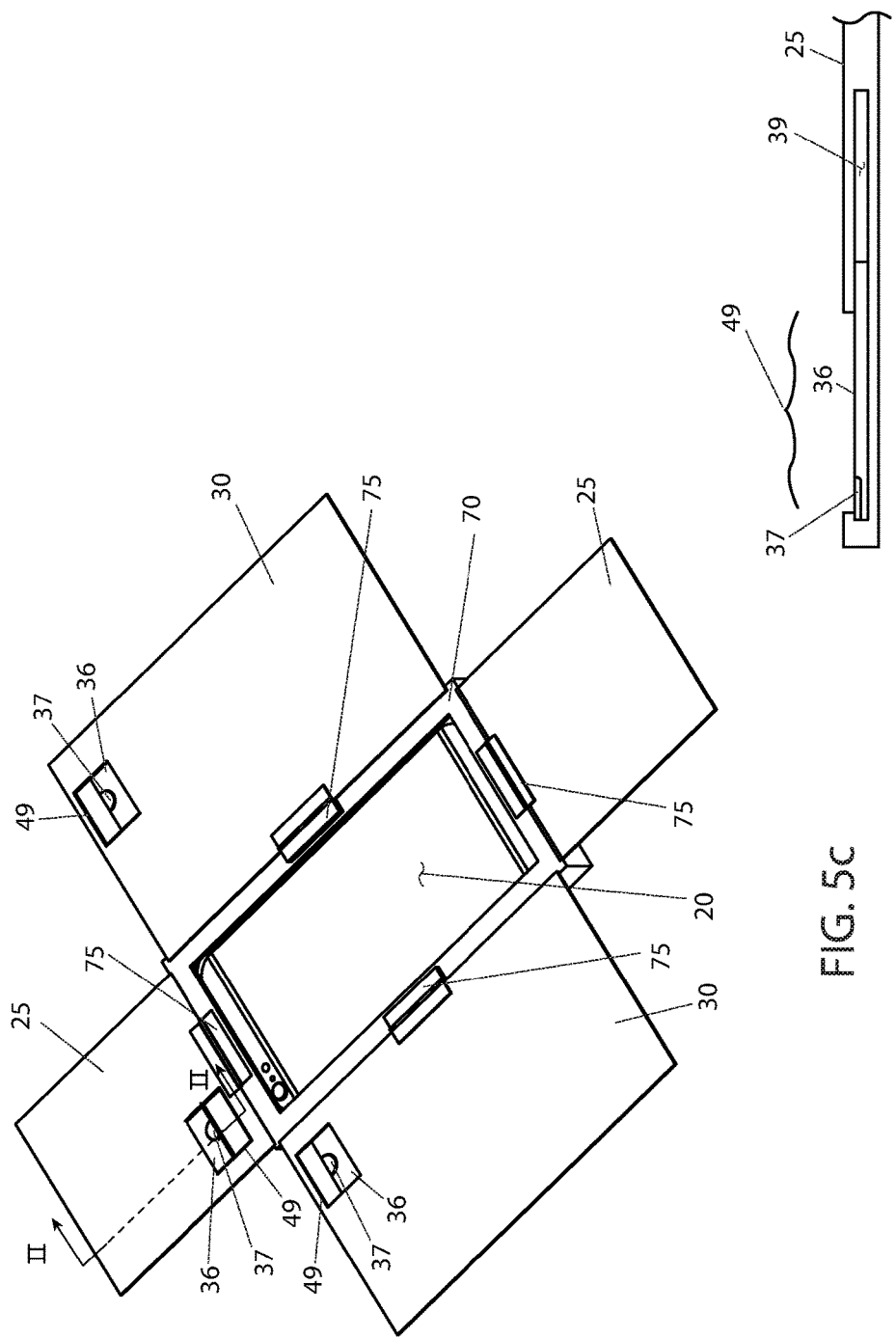

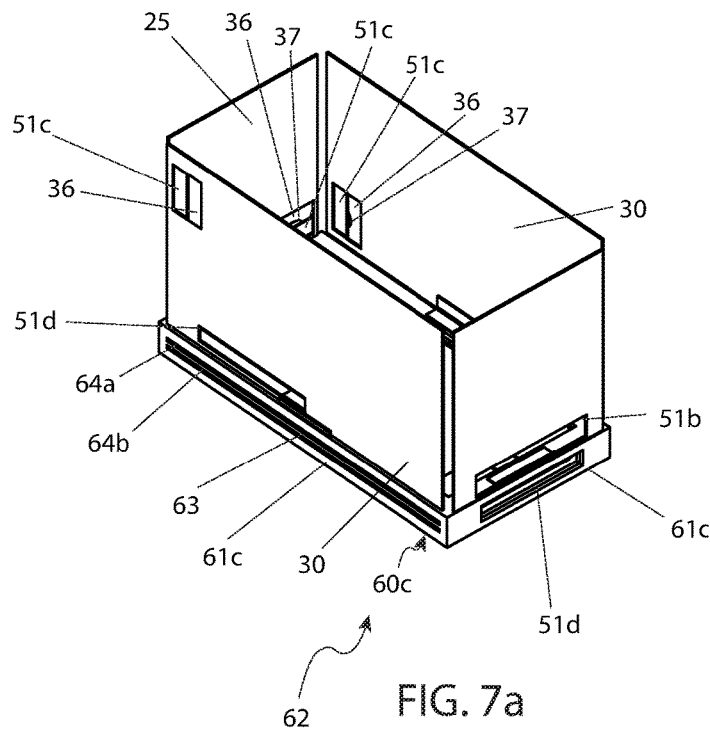
FIG. 7a
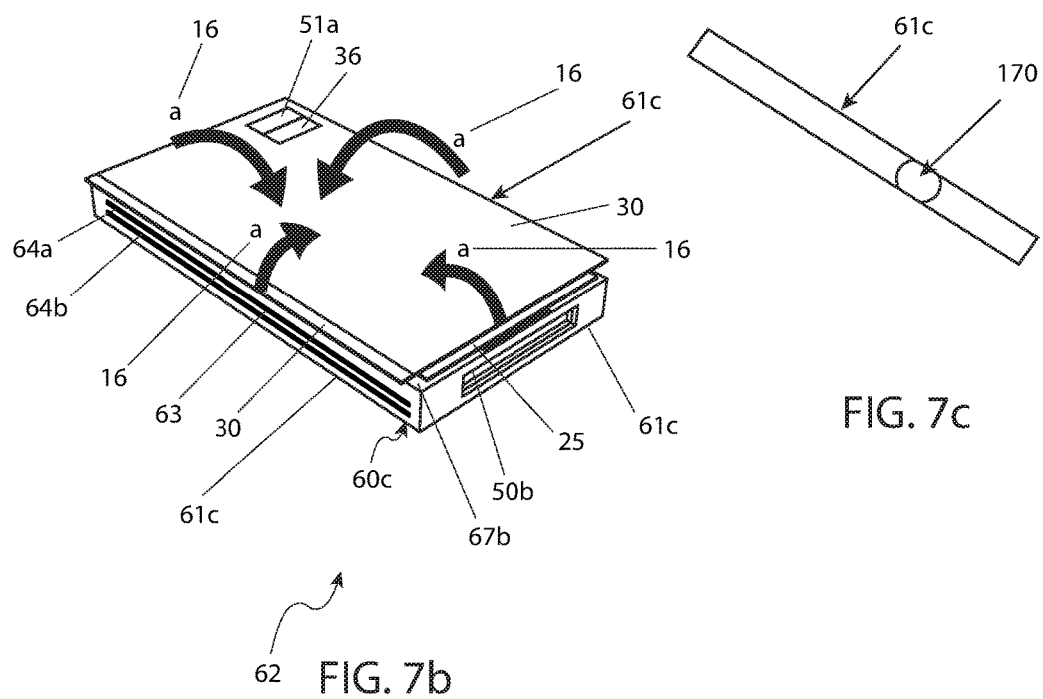
FIG. 7c
FIG. 7b

GLARE SHIELD FOR A MOBILE TELEPHONE

RELATED APPLICATIONS

Not applicable.

FIELD OF THE INVENTION

The present invention relates generally to the field of shields for viewing portable electronic devices from unauthorized view and unwanted glare.

BACKGROUND OF THE INVENTION

In recent years, society has seen the handheld cellular phone go from a device that was used only by a select few people, during select few times to a device that is used by everyone at almost any time. And like many other devices, with increased popularity, its drawbacks have become more evident. Some of these drawbacks include the inability to easily see this screen when using the phone outdoors under bright sunlight conditions.

To help with readability, many users are forced to turn their screen brightness to maximum, which helps somewhat, but also greatly decreases battery life. Also, the large screen of the portable electronic device is easily seen by those nearby resulting in a loss of personal privacy as well. Finally, cell phone accessory manufacturers are on the constant outlook for the new and latest accessories in order to increase their market share over that of their competitors. Accordingly, there exists a need for a means by which cellular phones can be modified in order to address the above-mentioned deficiencies. The development of the privacy and glare shield for mobile phones and PDA (Personal Digital Assistance) type devices fulfills this need.

SUMMARY OF THE INVENTION

The principles of the present invention provide for a privacy and glare shield for use with a portable electronic device. In one (1) embodiment, the portable electronic device is capable of being retained within a frame holder. The frame holder may or may not have an attachment means for retaining the portable electronic device therein. The frame holder has a bottom wall with a bottom wall aperture and a sidewall with a plurality of sidewall apertures. The apertures are located to be aligned with communication ports, control buttons, and camera lens of the portable electronic device. In certain embodiments, the frame holder has a top wall with a central cut-out. The top wall aids in retention of the portable electronic device therein. In other embodiments, the frame holder sidewall also has a longitudinal slit enabling insertion and removal of the portable electronic device. In other embodiments, a shield assembly exists that is removably placed on the frame holder. In these embodiments, the frame holder top wall does not exist; retention of the portable electronic device is thus affected by a shield assembly top wall, also having the cut-out. A shield assembly sidewall extends away from the shield assembly top wall and has apertures that align with the apertures on the frame holder sidewall. A pair of long side shield screens are hingedly attached to opposing sides of the shield assembly top wall. Similarly, a pair of short side shield screens are hingedly attached to opposing sides of the shield assembly top wall. The long and short side shield screens are capable of manipulation between a fully deployed state, which creates a "tunnel" effect for viewing the portable electronic device, and a fully stowed state, in which they lie on top of the shield assembly top wall to gully cover the cut-out. If necessary, the side shield screens have mating attachment means to maintain the deployed orientation. In embodiments where the shield assembly is not present, the side shield screens are hingedly attached to the frame holder top wall.

A further object of the invention is to enable one (1) of said pair of long side shield screens to have a pair of openings on opposing sides, adjacent to the shield holder top wall, or in embodiments where the shield assembly is not present, to the frame holder top wall.

Another object of the invention is to provide a first shield screen aperture located on a first short side shield screen adjacent the frame holder bottom wall aperture, a second shield screen aperture located on a first long side shield screen adjacent the frame holder bottom wall aperture, and a third shield screen aperture located on a second long side shield screen adjacent the frame holder bottom wall aperture. The first, second, and third screen shield apertures are capable of aligning with the frame holder bottom wall aperture and camera lens of the portable electronic device when the first short side shield screen, first long side shield screen, and second long side shield screen are manipulated towards the frame holder bottom wall.

Yet another object of the present invention includes where the first, second, and third shield screen apertures each have a shield tab capable of opening or closing a respective aperture.

Still yet another object of the present invention includes at least one (1) stand located on a rear surface of said frame holder bottom wall.

Still yet another object of the present invention includes a bi-directional belt loop system located on a rear surface of said frame holder bottom wall. In certain embodiments, a clip is located on an outer surface of said bi-directional loop system.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 5a is a perspective view of the screen assembly 65, illustrating a set of deployable shield tabs 36, according to a first embodiment;

FIG. 5b is a sectional view along the line I-I of FIG. 5a, showing detail of an individual deployable shield tab 36, according to the first embodiment;

FIG. 5c is a perspective view of the screen assembly 65, illustrating a set of deployable shield tabs 36, according to a second embodiment;

FIG. 5d is a sectional view along the line II-II of FIG. 5c, showing detail of an individual deployable shield tab 36, according to the second embodiment;

FIG. 7a is a top perspective view of the pocket embodiment 62 according to a second embodiment of the present invention;

FIG. 7b is a top perspective view of the pocket embodiment 62, shown in a folded state, according to a second alternate embodiment of the present invention;

FIG. 7c is a side view of the pocket embodiment 62, showing an alternate pocket cover side wall 61c having a finger access aperture 170.

DESCRIPTIVE KEY

- 10 privacy and glare shield
- 15 frame holder
- 16 first travel path "a"
- 17 second travel path "a'"
- 20 portable electronic device
- 25 short side shield screen
- 30 long side shield screen
- 31 first magnet
- 32 second magnet
- 35 user
- 36 shield tab
- 37 grip
- 39 pocket
- 40 pivoting pin
- 41 pivot aperture
- 45 horizontal surface
- 48 side wall aperture
- 49 shield aperture
- 50a aperture
- 50b case cover aperture
- 50c pocket cover aperture
- 51a case cover side shield screen first aperture
- 51b case cover side shield screen second aperture
- 51c pocket cover side shield screen first aperture
- 51d pocket cover side shield screen second aperture
- 56 adhesive
- 57 strap
- 60a frame holder bottom wall
- 60b case cover bottom wall
- 60c pocket cover bottom wall
- 61a frame holder side wall
- 61b case cover side wall
- 61c pocket cover side wall
- 62 pocket embodiment
- 63 slit
- 64a first slit fastener
- 64b second slit fastener
- 65 screen assembly
- 66 case cover embodiment
- 67a case cover top wall
- 67b pocket cover top wall
- 70 screen frame top wall
- 71 screen frame side wall
- 75 hinge
- 80a first grasping aperture
- 80b second grasping aperture
- 90 incoming vision/glare
- 92 standing assembly
- 93 kickstand
- 94 kickstand pocket
- 95a first folding support
- 95b second folding support
- 96 support tab
- 97 support slot
- 100 travel path "b"
- 114 first long side shield screen
- 115 second long side shield screen
- 116 opening
- 145 bi-directional belt loop system
- 146 first belt loop
- 147 second belt loop
- 148 clip
- 150 first belt access path
- 155 second belt access path
- 160 aperture size adjusting insert
- 165 aperture size adjusting insert window
- 170 finger access aperture

DETAILED DESCRIPTION OF THE PREFERRED EMBODIMENT

The best mode for carrying out the invention is presented in terms of its preferred embodiment, herein depicted within FIGS. 1 through 12. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope.

All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

Figure 1:
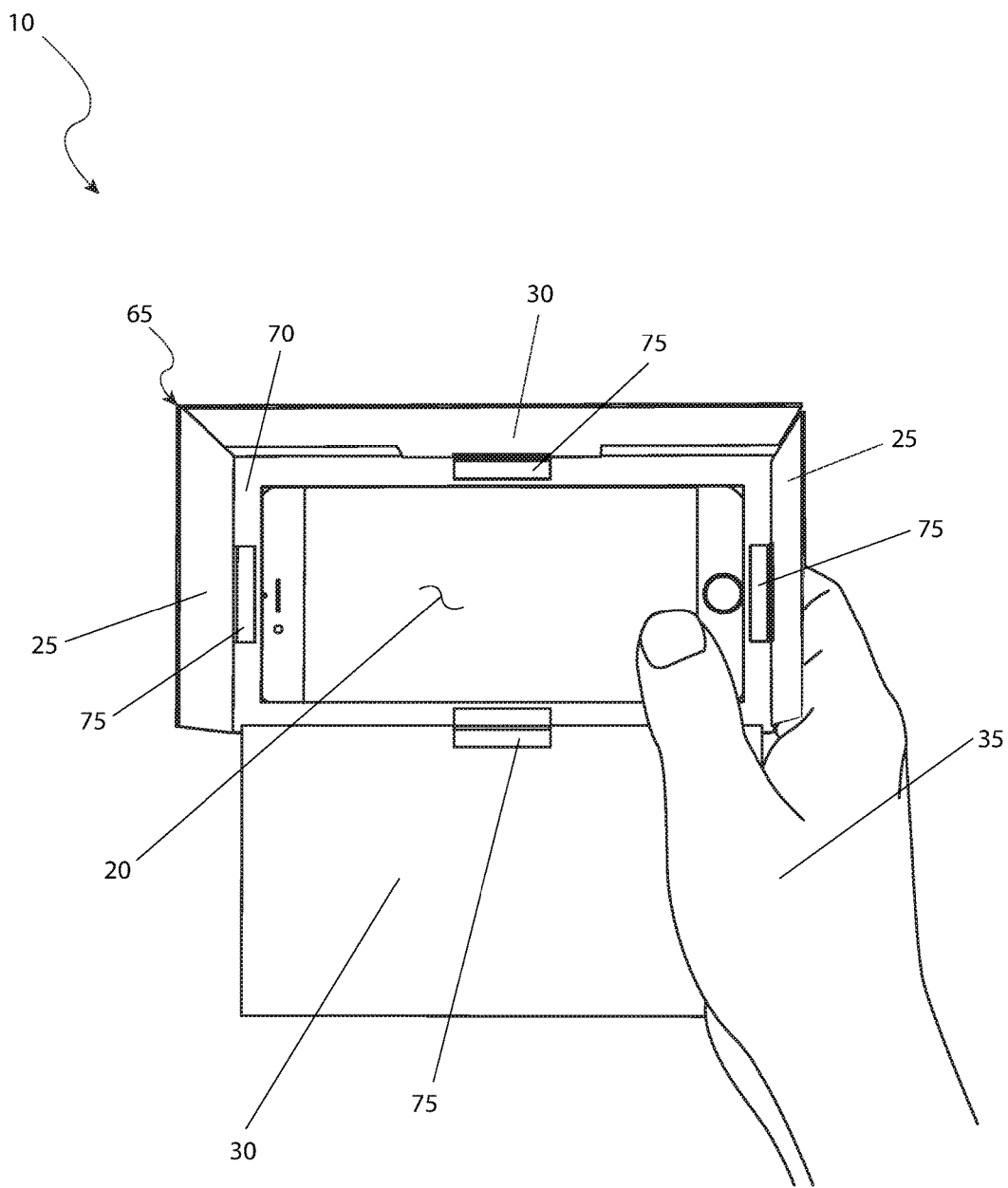
FIG. 1 is a front perspective view of the privacy and glare shield 10 in a landscape mode, according to a preferred embodiment of the present invention.

Referring now to FIG. 1, a perspective view of the privacy and glare shield 10 in a landscape mode, according to the preferred embodiment of the present invention is disclosed. The privacy and glare shield provides a shield attachment available generally in three (3) different embodiments 10, 62, 66 for use on portable electronic devices 20, such as smart phones. It is intended to reduce screen glare and increase privacy. Each embodiment 10, 62, 66 holds the portable electronic device 20 to be used in a portrait or a landscape orientation, and would be made available in all sizes to fit all makes and models of portable electronic devices 20. The positioning of either embodiment 10, 62, 66 provides protection against incoming vision/glare 90 that would otherwise interfere with viewing of the portable electronic device 20 or sacrifice a user's 35 personal privacy.

FIG. 1 depicts utilization of a preferred embodiment of the device 10 in the "landscape" mode. A frame holder 15 secures the portable electronic device 20, such that the screen portion of the portable electronic device 20 faces outward. A screen assembly 65 slides over the frame holder 15 and portable electronic device 20 and creates a "tunnel" or four-sided shield for the portable electronic device 20. The screen assembly 65 includes a pair of short side shield screens 25 and a pair of long side shield screens 30 which are deployed along each of the four (4) sides of the screen assembly 65 to frame the portable electronic device 20 screen. In this figure, one (1) of the two (2) long side shield screens 30 is folded outward thus allowing a user 35 to hold the device 10 in a landscape orientation. All following embodiments provide shielding that directs the view to the eyes of the user 35, while keeping sunlight, glare, and the vision of anyone nearby with roving eyesight, away from the screen. This improves readability and increases privacy. Additionally, as vision is improved, the brightness of the screen of the portable electronic device 20 may be diminished, either automatically or manually, thus reducing power consumption of the portable electronic device 20 and improving battery life. The side shield screens 25, 30 of the shield assembly 65 can fold against the frame holder 15 to orient the device 10 in a stowed configuration, viewed as beneficial for storage or travel while providing physical protection for the portable electronic device 20.

Figure 2A:
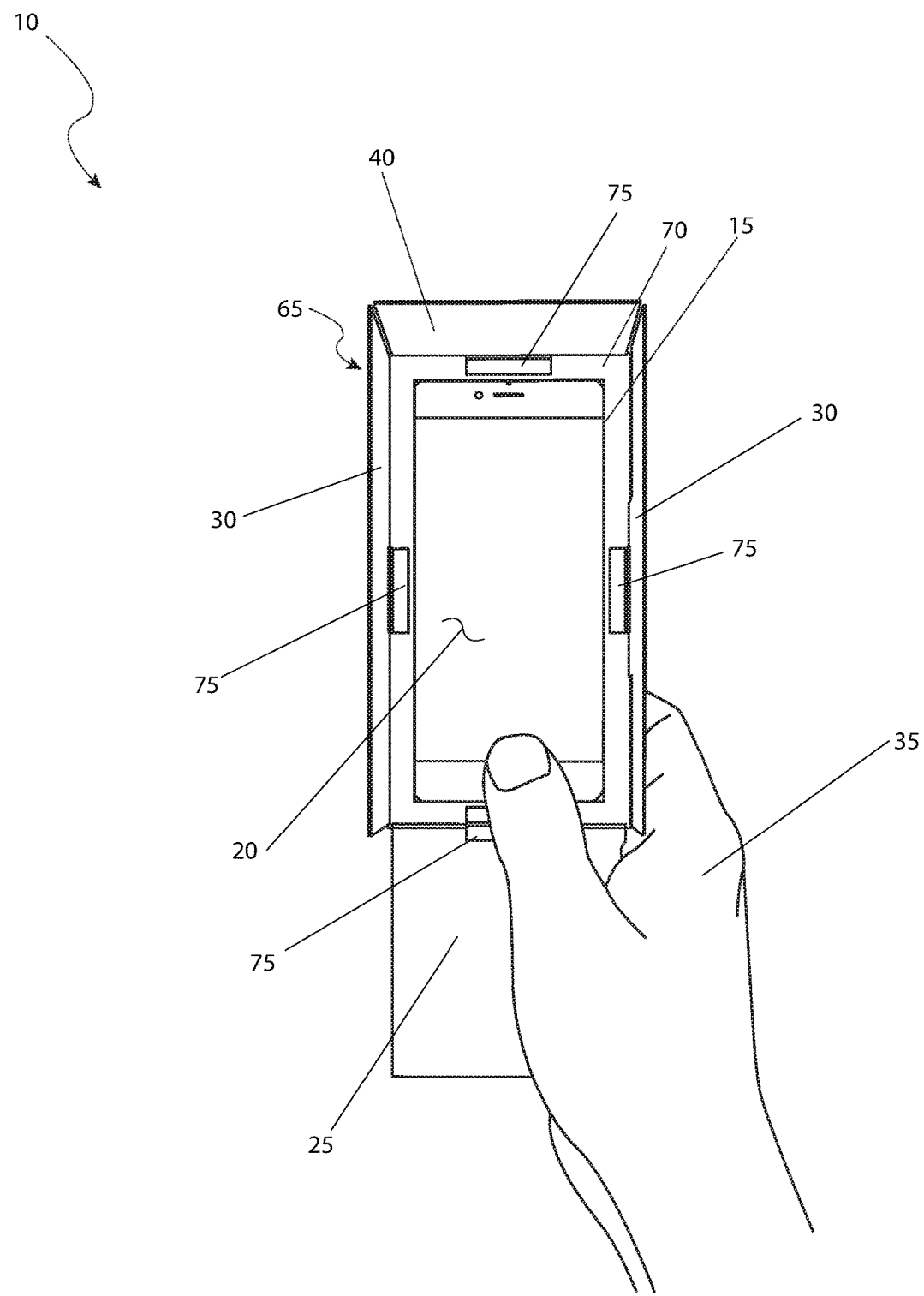
FIG. 2a is a front perspective view of the privacy and glare shield 10 in a portrait mode, according to the preferred embodiment of the present invention.

Referring next to FIG. 2a is a perspective view of the device 10 in a portrait mode, according to the preferred embodiment of the present invention is depicted. Description and utilization of the device 10 is similar to that described in FIG. 1, with the change of the device 10 and portable electronic device 20 being utilized in a "portrait" mode. The portable electronic device 20 still resides in a frame holder 15 with four (4) side shield screens 25, 30 of the screen assembly 65 deployed. One (1) of two (2) short side shield screens 25 is folded outward at the lower side of the device 10 to allow for holding and access by a user 35. As before, readability and privacy, especially in outdoor environments are improved.

Figure 2B:
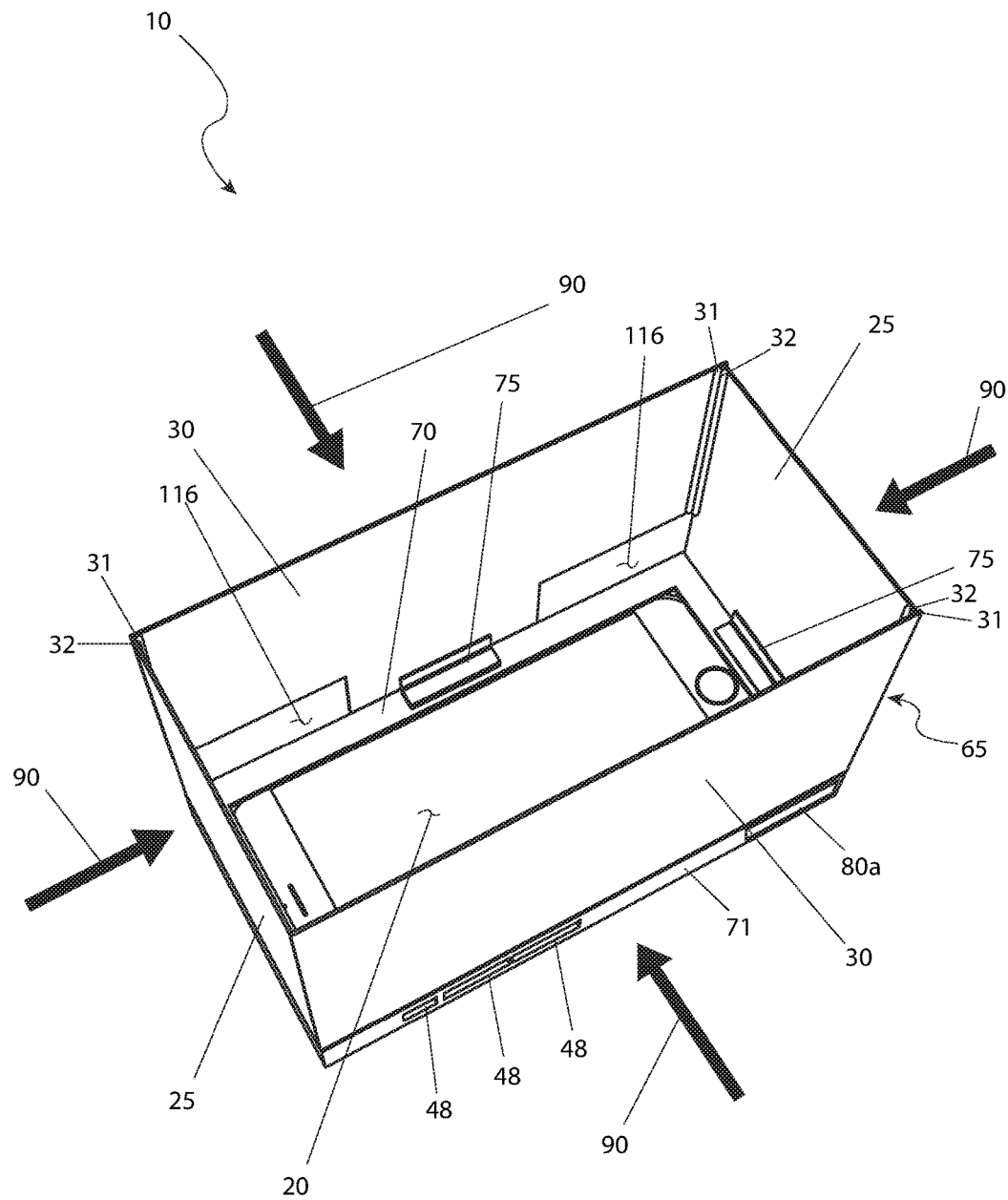
FIG. 2b is a top perspective view of the privacy and glare shield 10, shown in a landscape mode, according to the preferred embodiment of the present invention.

Referring now to FIG. 2b is a perspective view of the device 10, shown in use on a horizontal surface 45, according to an embodiment of the present invention is shown. The horizontal surface 45 is envisioned to include but not be limited to: a desk, a table, a countertop, a dashboard, or the like. Angled positioning of the device 10 is assisted by positioning devices which will be described in greater detail herein below. As before, the portable electronic device 20 is mounted in a frame holder 15. The application as provided in FIG. 2b provides for all four (4) side shield screens 25, 30 of the screen assembly 65 being positioned nearly perpendicular to the screen of the portable electronic device 20. Such usage is viewed as ideal when utilizing the portable electronic device 20 for watching videos in a bright environment such as what may occur when streaming video content, viewing live video, performing video chats, or the like. Each of the side shield screens 25, 30 are attached via first magnets 31 magnetically attracted to second magnets 32 to keep the side shield screens 25, 30 in the upright configuration. In a preferred embodiment, the first magnets 31 are located at perimeter side edges of the long side shield screens 30 and the second magnets 32 are located at the perimeter side edges of the short side shield screens 25. Other means and methods of fixing the side shields 25, 30 together to create the "tunnel" or privacy shield are envisioned, such as slots and tabs. It may be necessary to provide different lengths of the short side shield screens 25 to accommodate for different sizes of portable electronic devices 20 to provide for the best "tunnel" effect. Such lengths of the short side shield screens 25 may approach the length itself of the portable electronic device 20, or the overall length of the frame holder 65. Also shown is a pair of first grasping apertures 80a, located on either opposing sides of the long ones of the screen frame side walls 71 and preferably aligned with each other. The purposes of these grasping apertures 80a is to allow a user to grasp the frame holder side walls 61a with the same hand while removing the screen assembly 65 with the other hand.

Figure 3:
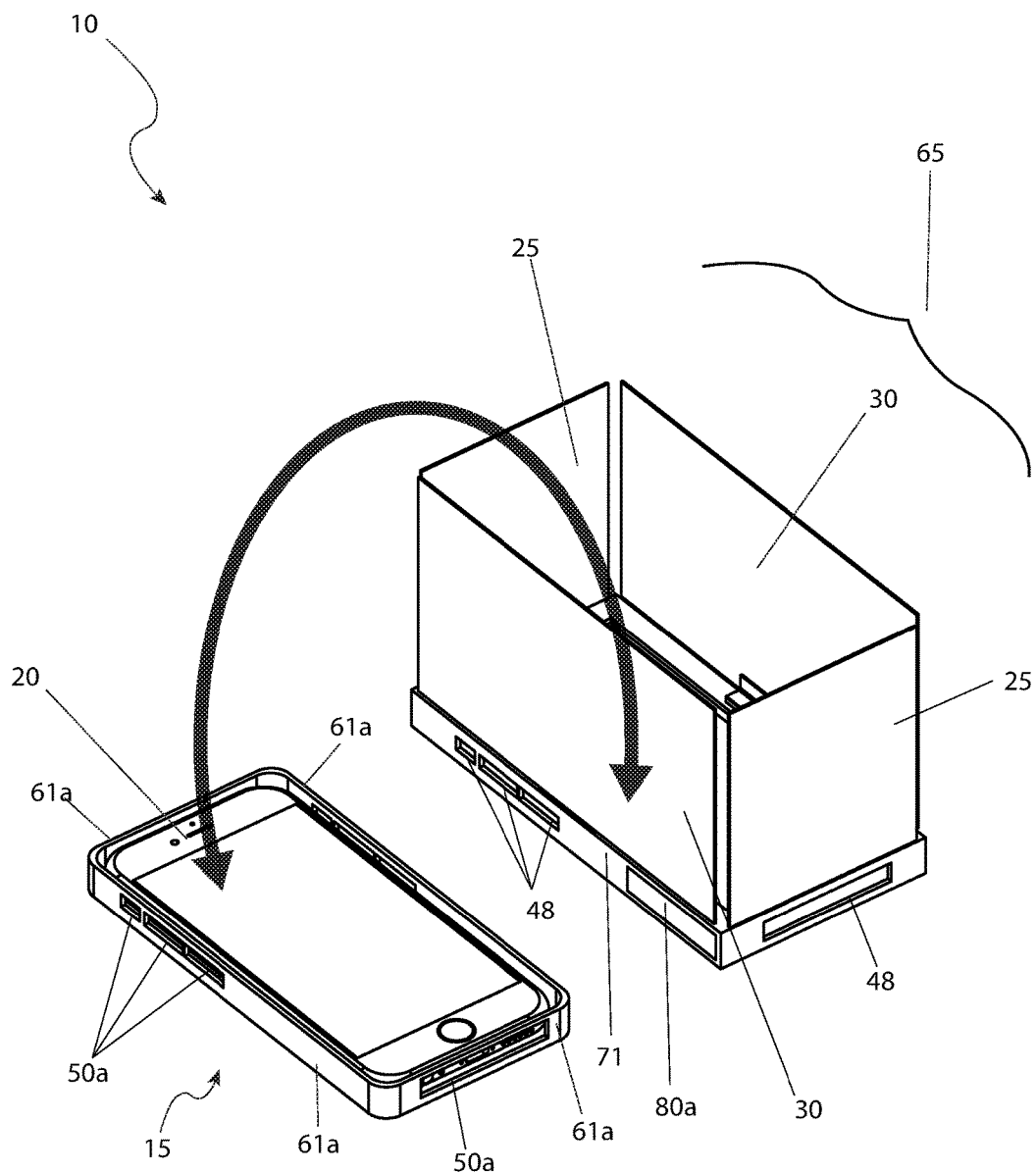
FIG. 3 is a top perspective view of the frame holder 15 and screen assembly 65 components separated, according to the preferred embodiment of the present invention.

FIG. 3 depicts the device 10 when the frame holder 15 (having the portable electronic device 20 installed therein) removed from the shield assembly 65.

Figure 4A:
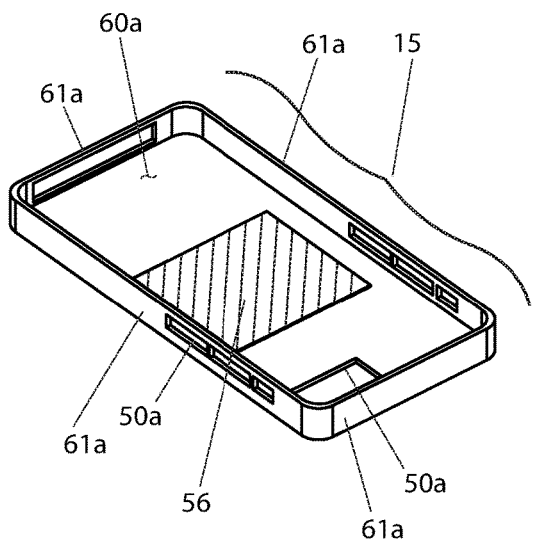
FIG. 4a is a perspective of the frame holder 15, shown in an empty state with an adhesive attachment method 56, according to a first embodiment.

Referring next to FIG. 4a is a perspective of the frame holder 15, shown in an empty state. The frame holder 15 would be made available in multiple sizes to fit a wide variety of makes and models of the portable electronic device 20 (as shown in FIGS. 1 through 3). The frame holder 15 has a generally shallow depth and is provided with multiple apertures 50a for the purposes of accommodating various input and output functions of the portable electronic device 20 (as shown in FIGS. 1 through 3). The quantity and placement of the apertures 50a will vary per make and model of the portable electronic device 20 (as shown in FIG. 1) and the illustrated example is not intended to be a limiting factor. The apertures 50a would be used to accommodate features including but not limited to: speakers, microphones, power jacks, data jacks, camera lenses, volume control switches, power control switches, SIM access doors, data card access doors and the like. The frame holder 15 therefore is described as having a frame holder bottom wall 60 and a frame holder side wall 61a that upstands from a perimeter side edge of the frame holder bottom wall 60. A preferred embodiment is that the frame holder side wall 61a is gently curved at the four (4) corners to eliminate unintended snagging and to provide a fashionable profile.

Figure 4B:
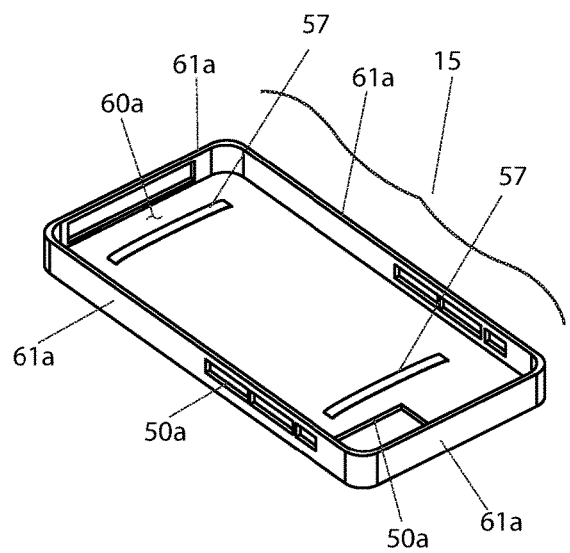
FIG. 4b is a perspective of the frame holder 15, shown in an empty state with an elastic strap attachment method 57, according to a second embodiment.

FIGS. 4a and 4b illustrate two (2) embodiments of a reusable attachment method centrally located on the inner surface of the frame holder bottom wall 60. It is envisioned that various methods of attachment such as adhesive 56, at least (1) elastic strap 57, small suction cups, or the like may be utilized, and as such, the particular use or exclusion of any means of attachment is not intended to be a limiting factor of the present invention.

FIGS. 5a-5d illustrate the second main component of the device 10, a screen assembly 65, where the various side shield screens 25, 30 are pivotally attached to a screen frame top wall 70. The side shield screens 25, 30 are mounted to the screen frame top wall 70 via four (4) hinges 75 sharing a common edge. The hinges 75 enable each side shield screen 25, 30 to either fold forward in a first travel path "a" 16 (see FIG. 6a) towards to cover the screen of the portable electronic holder 20 when installed within the frame holder 15, or a second travel path "a'" 17 (see FIG. 6b) towards the rear of the frame holder 15 to fully expose the portable electronic device 20. The side shield screens 25 may be left folded away (as shown) or deployed for use (as shown in FIG. 3). The hinges 75 may be locking hinges, where the position of the respective side shield screen 25, 30 is fixed, or hinges that do not lock.

The screen assembly 65 is placed on top of the frame holder 15 for utilization in much the same manner as a box lid. The screen frame top wall 70 is generally a planar member with central cut-out large enough to permit unimpeded viewing of the screen of the portable electronic device 20, while partially covering the bezel or frame of the portable electronic device 20 to restrict it from falling out of the central cut-out. About a perimeter lower edge of the screen frame top wall 70 is a screen frame side wall 71, similar in size and shape as the frame holder side wall 61a and configured to fully cover in a sung and resilient fit. Also, if deemed necessary, magnets or any other similar mating attachment means may be used to secure the screen assembly 95 to the frame holder 15. The screen assembly side wall 71 also has side wall apertures 48 that are oriented and configured to align with the apertures 50a on the frame holder side wall 61a to enable access to the function buttons and communication ports on the portable electronic device 20.

Figure 6A:
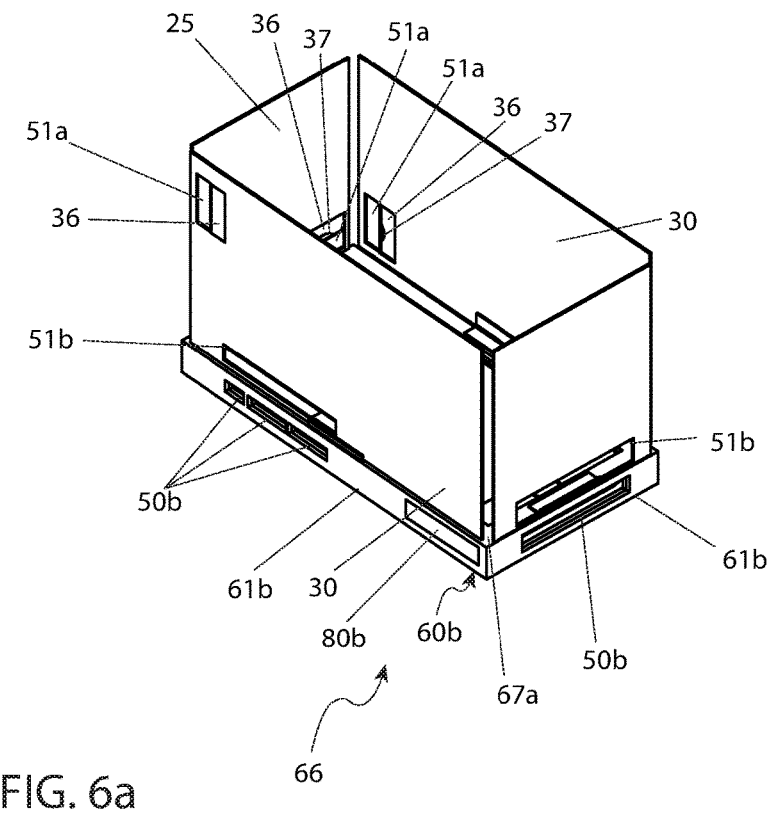
FIG. 6a is a top perspective view of the case cover embodiment 66, shown in a deployed state, according to a first alternate embodiment of the present invention.
Figure 6B:
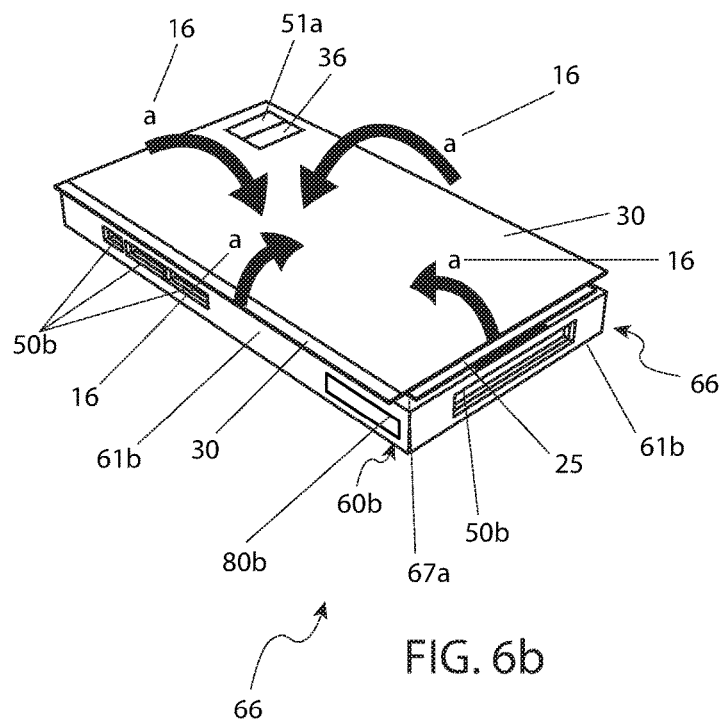
FIG. 6b is a top perspective view of the case cover embodiment 66, shown in a first folded state, according to a first alternate embodiment of the present invention.

FIGS. 5a-5d illustrate the screen assembly 65 having shield apertures 49 that, when aligned, provide a combined aperture that is intended to align with the aperture 50a on the rear of the frame holder 15 and the camera eye of the portable electronic device 20 commonly located on many makes and models when the side shields 25, 30, are manipulated via the second travel path "a'" 17 (see FIG. 6b). When the side shields 25, 30 are manipulated in the first travel path "a" 16 (see FIG. 6a), and fixed together via the magnets 31, 32 or other means to create the "tunnel" or privacy shield, the shield apertures 49 must have a movable shield tab 36 to selectively close or open the respective shield aperture 49. In the preferred embodiment, both long side shield screens 30 incorporate the shield apertures 49 and shield tabs 36. Only one (1) of the short side shield screens 25 incorporate a shield aperture 49 and shield tab 36 while the opposing short side shield screen 25 does not. It is intended that the side of the portable electronic device 20 that incorporates such a camera eye is placed in the frame holder 15 on the side with the aperture 50a in the frame holder bottom wall 60 and the screen assembly 65 that has the short side shield screen 25 with the shield aperture 49 is placed over that same side of the frame holder 15 with installed portable electronic device 20.

FIGS. 5a and 5b illustrate a first embodiment of the shield tab 36, where a grip 37 is present in the inner side of the shield tab 36 to enable a user 35 to grasp the shield tab 36 and manipulate it with a single digit, such as a finger or thumb, without much difficulty. Such a grip 37 can be a slight depression in the shape of a semi-circle. The shield tab 36 has a pivoting pin 40 located on a corner of the shield tab 36 that is pivotally attached to the respective side shield screen 25, 30 through a pivot aperture 41. The shield tab 36 can pivot in a rotational path incrementally between a fully open shield aperture 49 or a fully closed shield aperture 49. The grip 37 is preferably located on the opposing edge of the shield tab 36 opposite the pivoting pin 40.

FIGS. 5c and 5d illustrate a second embodiment of the shield tab 36, where the shield tab 36 slidably engages a pocket 39 formed within the respective side shield screen 25, 30, adjacent to and in communication with the shield aperture 49. The shield tab 36 has a grip 37, similar in function and feature to the embodiment in FIGS. 5a and 5b, located on the shield tab 36 opposite the edge where it engages the pocket 39. The size of the pocket 39 is such that the depth of it is smaller than the size of the shield tab 36 in order to restrict the shield tab 36 from falling out of the shield aperture 49, and also to restrict the pocket 39 from totally enveloping the shield tab 36. Preferably, the pocket 39 is of a size to enable the grip 37 of the shield tab 36 to always be exposed so a user 35 can always enjoy the ability to manipulate the shield tab 36.

Figure 6C:
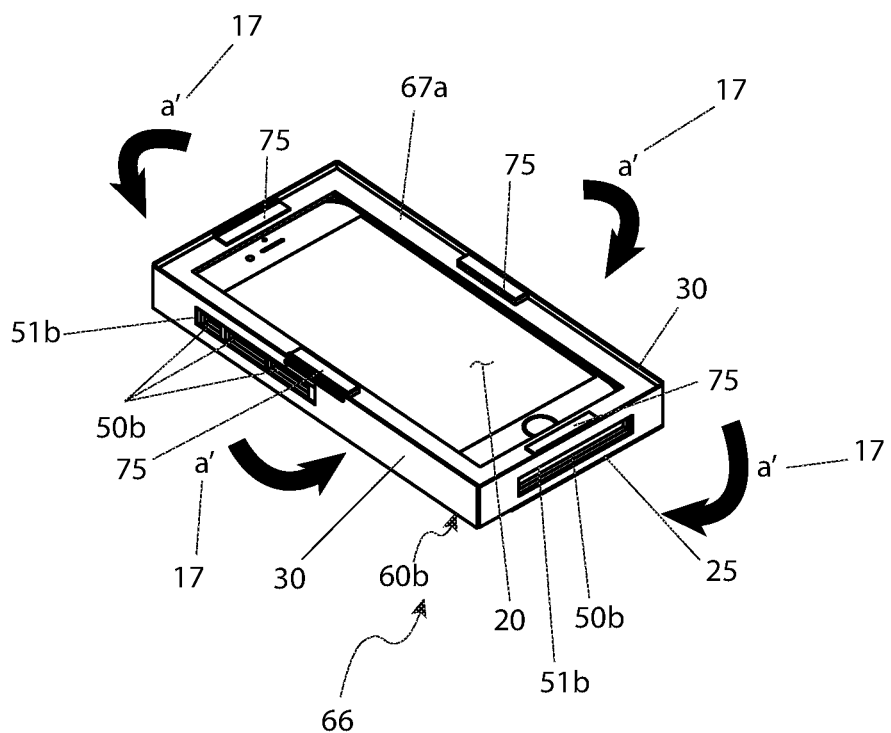
FIG. 6c is a top perspective view of the case cover embodiment 66, shown in a second folded state, according to a first alternate embodiment of the present invention.

FIGS. 6a-6c illustrate a second embodiment, herein described as a case cover 66, having a case cover top wall 67a, a case cover bottom wall 60b, and a case cover side wall 61b. The case cover 66 provides for a version where the side shield screens 25, 30 are hingedly attached, via the aforementioned and similarly constructed hinges 75, directly to the case cover top wall 67a. The case cover side wall 61b and case cover bottom wall 60b has case cover apertures 50b located in similar locations as the apertures 50a on the frame holder 15 of the preferred device 10. In this embodiment, the screen assembly 65 is not present. This provides a more streamlined and less bulky case cover embodiment 66, as well as having less parts.

It is appreciated that all similar features of the side shield screens 25, 30, such as functional travel paths "a" 16 and "a'" 17 are present in this case cover embodiment 66, as well as the shield tabs 36 covering the first apertures 51a on the side shield screens 25, 30. Further, the side shield screens 25, 30 have second apertures 51b on the sides to mimic the similarly sized and oriented apertures 50a of the screen frame side wall 71 of the preferred embodiment 10. The case cover top wall 67a is a small covering wall for the bezel portion of the portable electronic device 20 and has a central cut-out that does not interfere with the screen thereof. As such, it is similar in function and construction as the aforementioned screen frame top wall 70 of the preferred embodiment 10.

Also shown, and in similar locations and intended use as in the preferred embodiment 10, is a pair of second grasping apertures 80b, located on either opposing sides of the long ones of the case cover side walls 61b and preferably aligned with each other.

FIGS. 7a, 7b and 7c illustrate a third embodiment, herein described as a pocket embodiment 62. The pocket embodiment 62 is similarly sized and shaped as the case cover embodiment 66, having a pocket cover top wall 67b, a pocket cover bottom wall 60c, and a pocket cover side wall 61c. The pocket cover 62 provides for a version where the side shield screens 25, 30 are hingedly attached, via the aforementioned and similarly constructed hinges 75, directly to the pocket cover top wall 67b. The pocket cover side wall 61c and pocket cover bottom wall 60c has pocket cover apertures 50c located in similar locations as the apertures 50a on the frame holder 15 of the preferred device 10. At least one (1) of the sides of the pocket cover side walls 61b incorporates a slit 63 that may be coextensive or slightly smaller with the width thereof to accommodate the insertion or removal of the portable electronic device 20; however, separate embodiments are envisioned with having a slit 63 on each two opposite pocket cover side walls 61c. Preferably, the slit 63 is on an upper and lower sides with a respective first slit fastener 64a and a second slit fastener 64b, which are correspondingly mating fasteners that can be easily manipulated to open or close the slit 63 to enable access or secure retention of the portable electronic device 20. Such fasteners 64a, 64b can be hook-and-loop-type fasteners (Velcro®), zippers, magnets, etc. FIG. 7c details an alternate version of pocket cover side wall 61c having a finger access aperture 170 configured to permit the user to push the portable electronic device 20 through the slit 63.

It is appreciated that all similar features of the side shield screens 25, 30, such as functional travel paths "a" 16 and "a'" 17 are present in this pocket embodiment 62, as well as the shield tabs 36 covering the first apertures 51c on the side shield screens 25, 30. Preferably, however, an intended use would be for the side shield screens 25, 30 to travel in travel path "a" 16 so as to enable user access to the slit 63. Further, the side shield screens 25, 30 have second apertures 51d on the sides to mimic the similarly sized and oriented apertures 50a of the screen frame side wall 71 of the preferred embodiment 10. The pocket cover top wall 67b is a small covering wall for the bezel portion of the portable electronic device 20 and has a central cut-out that does not interfere with the screen thereof. As such, it is similar in function and construction as the aforementioned screen frame top wall 70 of the preferred embodiment 10.

Figure 8:
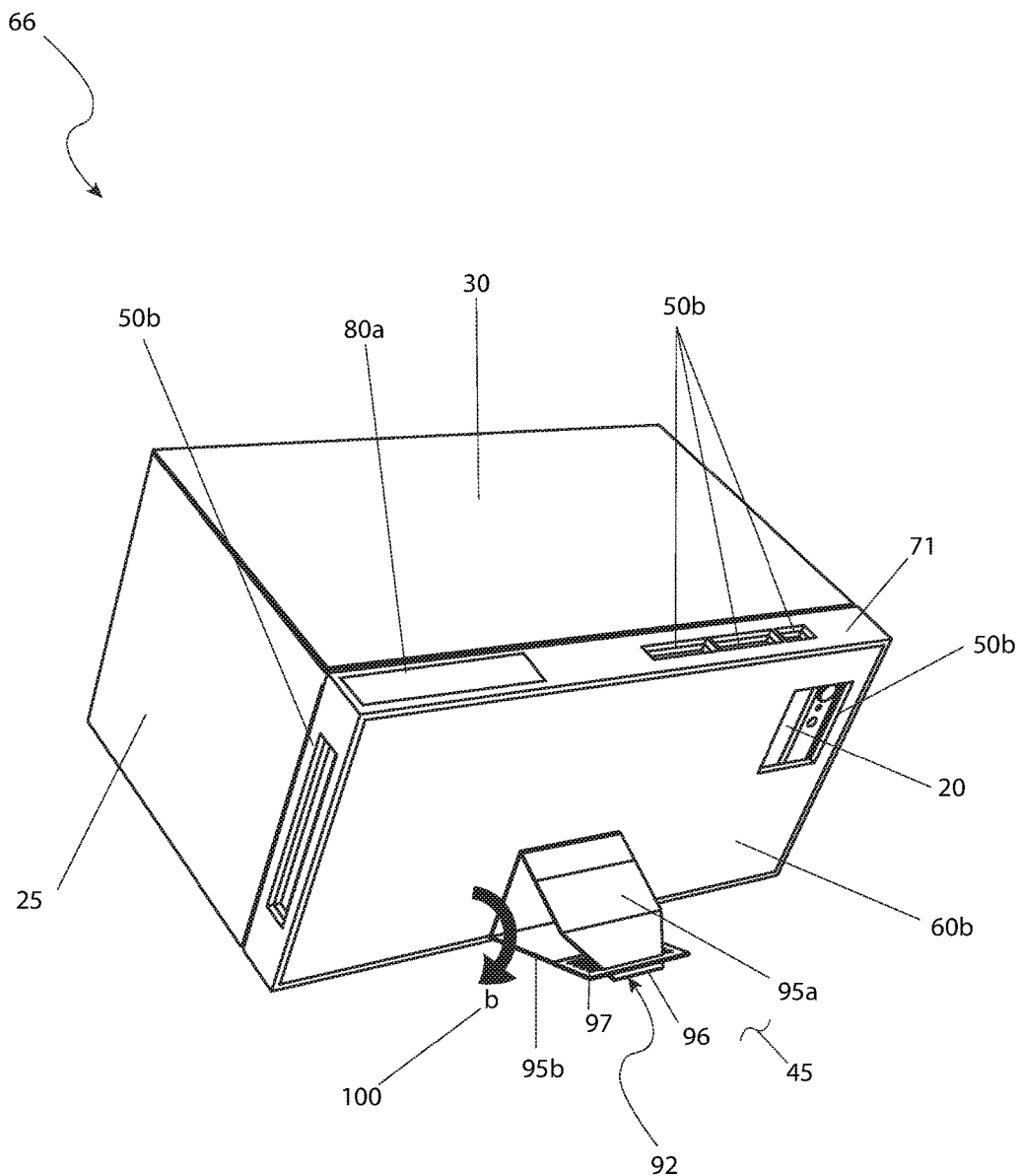
FIG. 8 is a perspective view of the privacy and glare shield 10, shown with a standing assembly 92, according to a third embodiment of the present invention.
Figure 9:
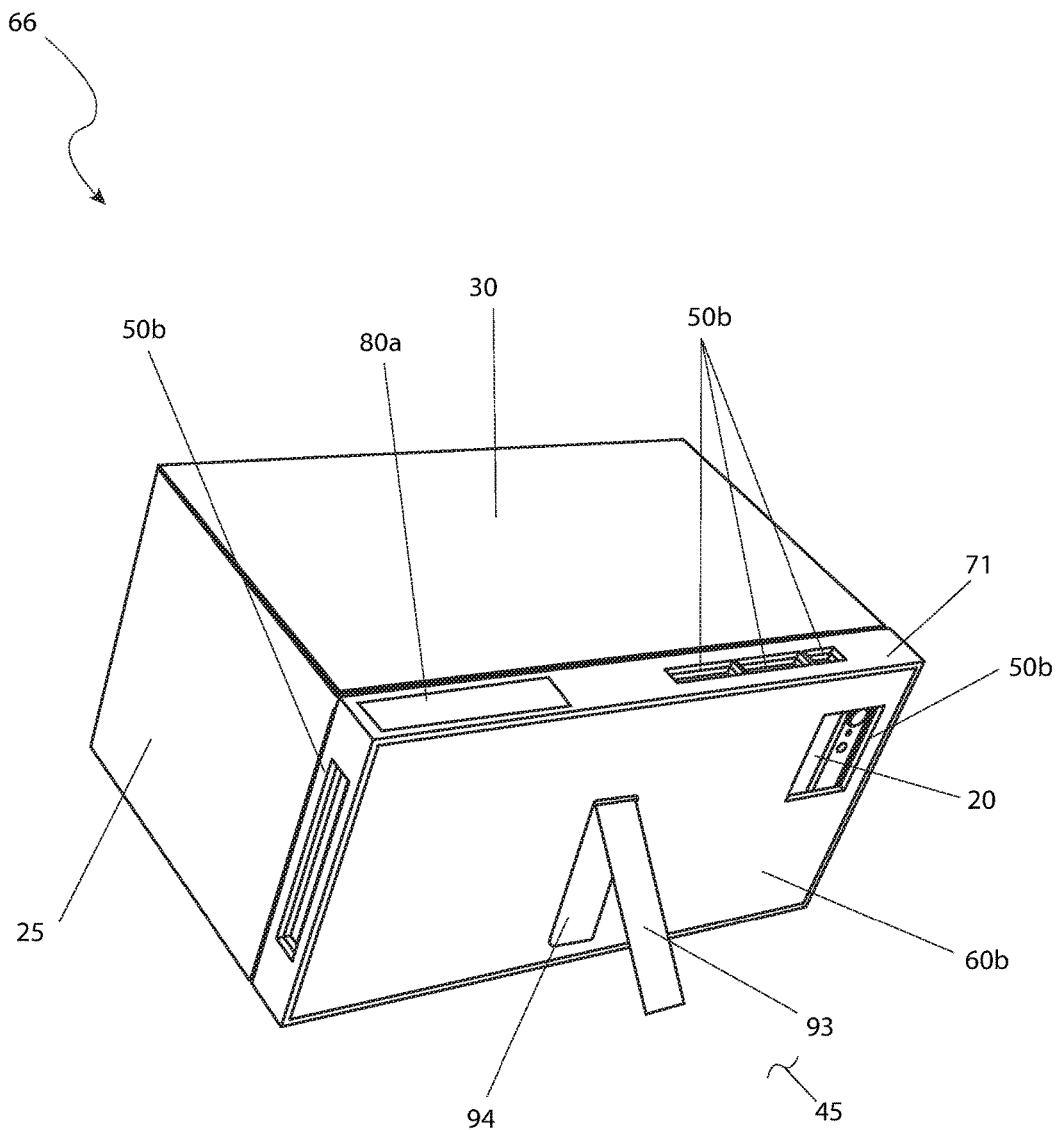
FIG. 9 is a perspective view of the privacy and glare shield 10, shown with a standing assembly 93, according to a third embodiment of the present invention.

Referring now to FIG. 8 and FIG. 9, depicting rear perspective views of the case cover embodiment 66. The side shield screens 25, 30 are visible and deployed. Additionally, the placement of the apertures 50b on both the sides of the case cover side wall 61b as well as the case cover bottom wall 60b are visible. These FIGURES illustrate two (2) types of stands.

In a first embodiment, a standing assembly 92 is affixed to the rear surface of the case cover bottom wall 60b, thus providing a sturdy stand for the case cover 66 when used for stationary viewing on a horizontal surface 45. A first folding support 95a is located at an intermediate position on the rear surface of the case cover bottom wall 60b and is hingedly attached thereto, preferably similar as the hinge 75. Similarly, a second folding support 95b is located at a lower edge position on the same rear surface of the case cover bottom wall 60b as the first folding support 95b and vertically aligned therewith. The first folding support 95a terminates in a tapered tab 96 and the second folding support 95b terminates in a plurality of aligned slots 97, each having a width enabling insertion of the tab 96 therein. The insertion and retention of the tab 96 in a first side of a desired one (1) of the plurality of slots 97 enables a different viewing angle to be achieved. The first and second folding supports 95a, 95b can also be folded back against the case cover bottom wall 60b and the tab 96 can be inserted into the opposite second side of an aligned one (1) of the plurality of slots 97 to affect a stowed position. The locking arrangement provided by the first folding support 95a and the second folding support 95b are typical of one (1) of many different styles of stands. Other methods such a lock hinged- or magnetic lock hinged-kickstand 93, telescopic lock hinged stands, hook-and-loop-type (Velcro®) locked hinged stands, and the like can be used with equal effectiveness. The kickstands 93 can be hingedly attached to the case cover bottom wall 60b, such that it can be deployed from a kickstand pocket 94. It is preferred that the kickstand pocket 94 enables retention of the kickstand 93 to provide a continuous outer surface flush with the outer surface of the case cover bottom wall 60b. As such the use or omission of any particular style of stand is not intended to be a limiting factor of the present invention. The supporting nature of the stand orientates the case cover 66 in a position to allow viewing on the horizontal surface 45. Appearance from a view of one hundred eighty degrees (180°) would be similar in appearance to FIG. 2b. It is appreciated that any of the stand embodiments can be similarly used and similarly oriented on either the preferred embodiment 10 or the pocket cover embodiment 62.

Figure 10:
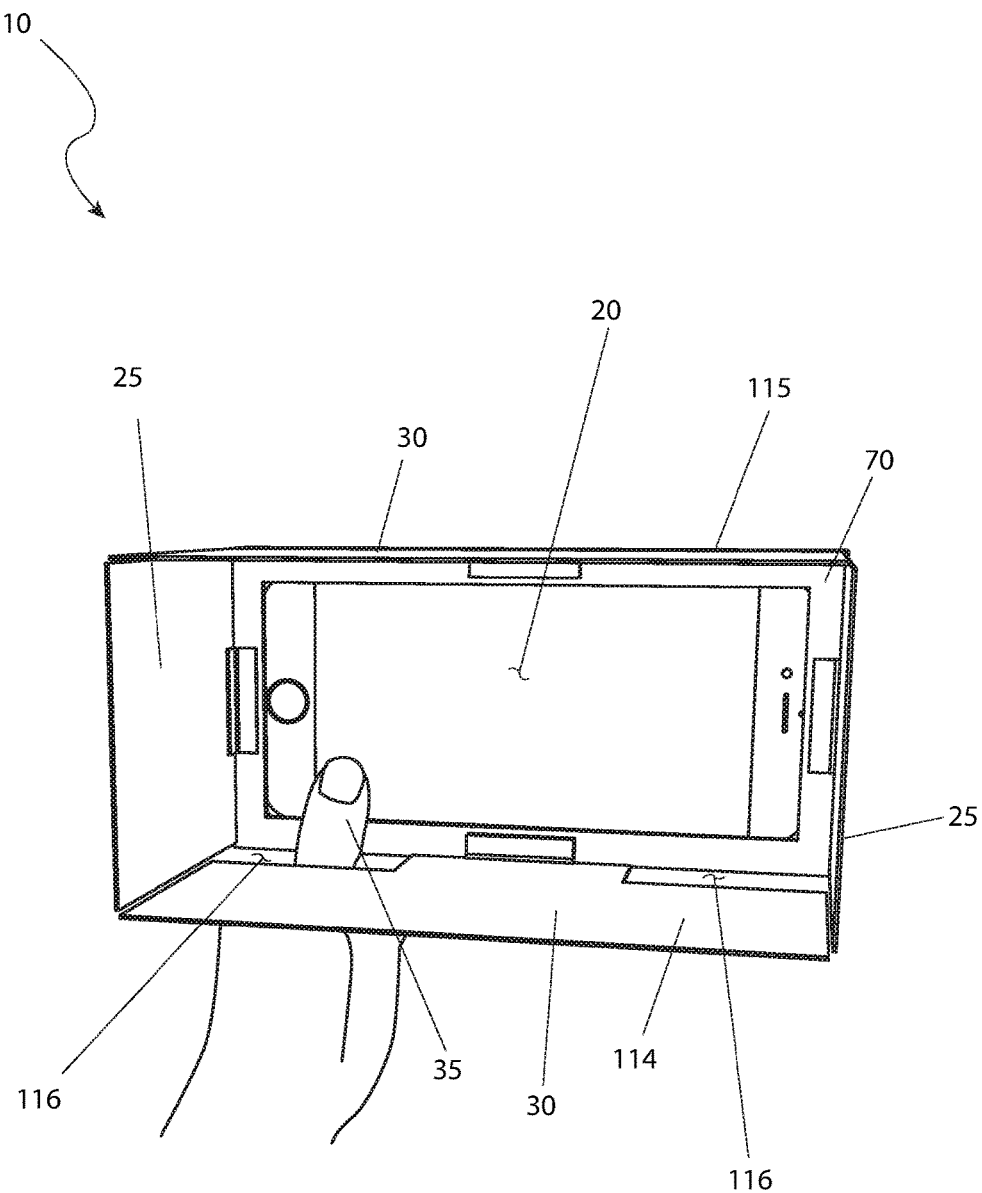
FIG. 10 is a front perspective view of the privacy and glare shield 10, shown in a utilized state, a preferred embodiment of the present invention.

Referring next to FIG. 10 is a perspective view of the preferred embodiment of the device 10 and shown in a utilized state. The configuration depicted discloses the portable electronic device 20 in a landscape position, although portrait orientation is also possible. The first long side shield screen 114 is extended in an outward position, parallel to the screen of the portable electronic device 20, as well as the second long side screen shield 115. Located at opposing corners of the first long side shield screen 114, and adjacent to the portable electronic device 20, are a pair of openings 116. These openings 116 allow the user 35 to access the portable electronic device 20 with fingers and/or thumbs. The remaining two (2) short side shield screens 25 and the second long side shield screen 115 provide shade from glare 90 as well as privacy from unwanted vision. It is appreciated that the openings 116 located on the first long side shield screen 115 can be similarly used and similarly oriented on either the case cover embodiment 66 or the pocket cover embodiment 62.

Figure 11A:
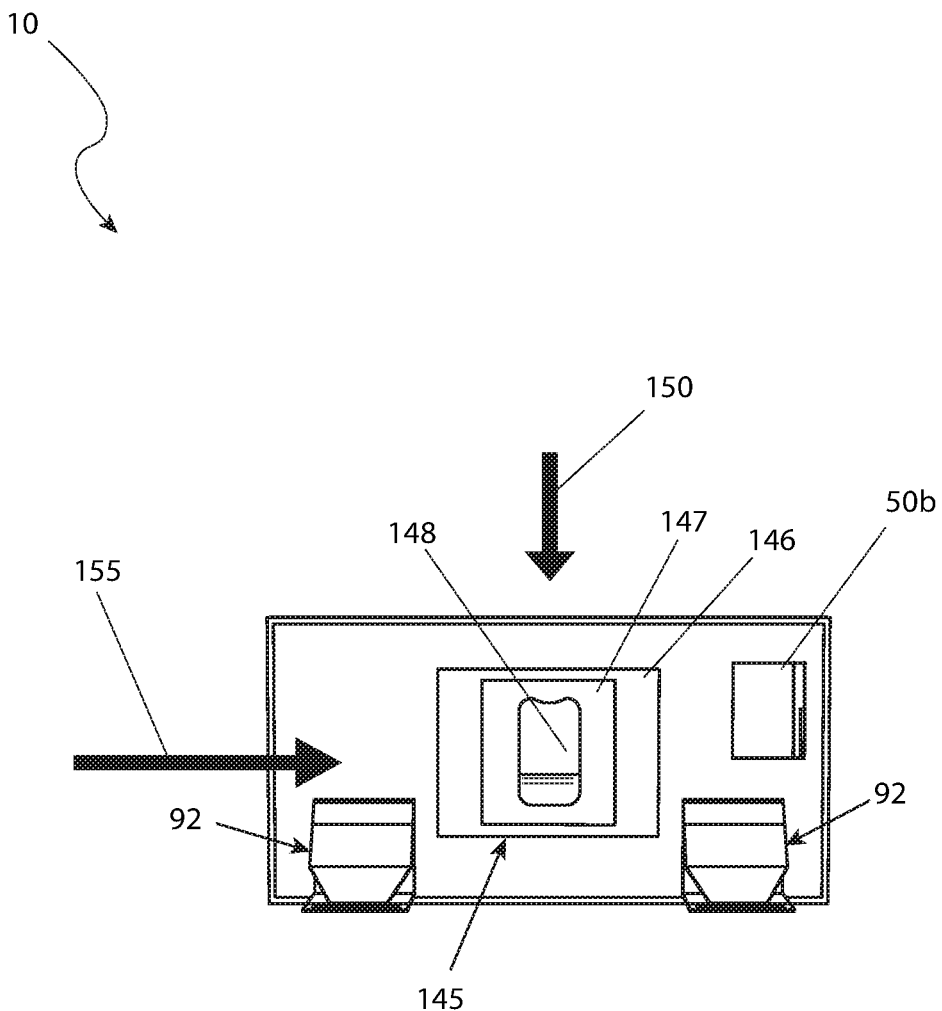
FIG. 11a is a rear perspective view of the privacy and glare shield 10, showing a pair of standing assemblies 92 and a bi-directional belt loop system 145, according to a fourth embodiment of the present invention.
Figure 11B:
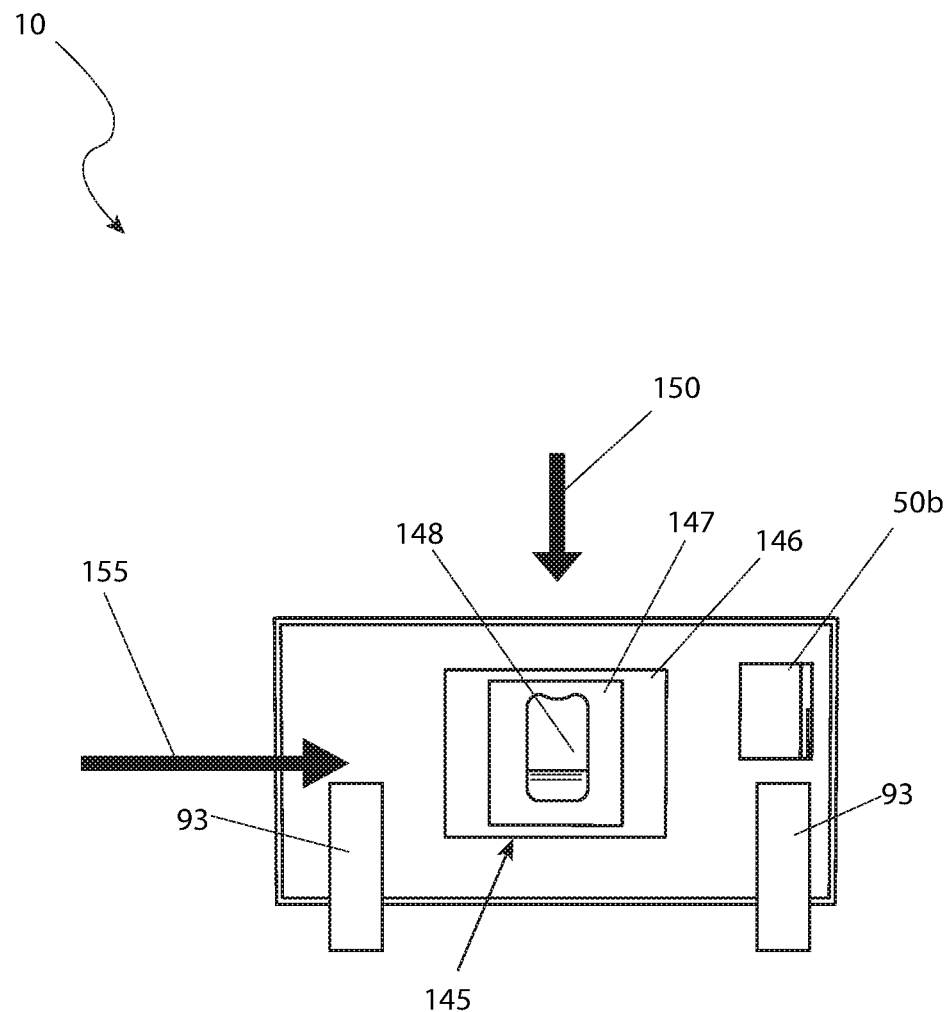
FIG. 11b is a rear perspective view of the privacy and glare shield 10, showing a pair of kickstands 93 and the bi-directional belt loop system 145, according to a fourth embodiment of the present invention; and, FIG. 12 is a perspective view of an aperture size adjusting insert 160, according to a fifth embodiment of the present invention.

Referring to FIGS. 11a and 11b, are a rear perspective views of the preferred device 10, according to a fourth embodiment of the present is depicted. This figure discloses a bi-directional belt loop 145 for securement of the device 10 upon a belt in either a horizontal or vertical position. The bi-directional belt loop 145 is preferably centrally located on the frame holder bottom wall 60a. A first belt access 150 provides for a first (illustrated herein as vertical) orientation of the device 10, while a second belt access 155 provides for a second (illustrated herein as horizontal) orientation of the device 10. The second belt access 155 is disposed on top of the first belt access 150. A belt clip 248 is located centrally on the second belt access 155 and can clip to a support structure, such as a belt loop, perimeter edge of pants, or the like. Also illustrated is a pair of stand assemblies 92 (see FIG. 11a) and a pair of kickstands 93 (see FIG. 11b). The dual embodiment of the stand assemblies 92 or kickstands 93 are preferably equidistantly disposed from a bisecting axial centerline of the frame cover 15.

Figure 12:
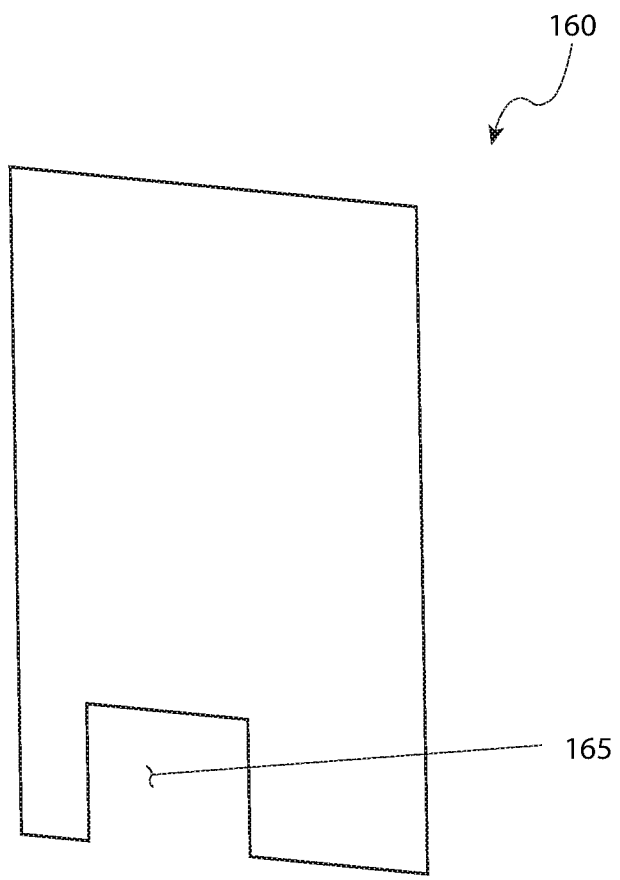

Referring lastly to FIG. 12, an aperture size adjusting insert 160, according to a fifth embodiment of the present invention is disclosed. The aperture size adjusting insert 160 comprises a shield having an aperture size adjusting insert window 165 disposed along one edge of the aperture size adjusting insert 160. The aperture size adjusting insert 160 is intended to be removably inserted against the frame holder bottom wall 60a thereby enabling a user to further adjust the size of the aperture 50a by selectively blocking more area of the aperture 50a. The aperture size adjusting insert 160 permits the device 10 to be further modified to accommodate a wide variety of differently sized and configured portable electronic devices 20.

It is appreciated that the dual stand assemblies 92 or the dual kickstand 93 can be similarly used and similarly oriented on either the case cover embodiment 66 or the pocket cover embodiment 62. Also, it is appreciated that the bi-directional belt loop system 145, and/or the belt clip 148 can be similarly used and similarly oriented on either the case cover embodiment 66 or the pocket cover embodiment 62.

The preferred embodiment of the present invention can be utilized by the common user in a simple and effortless manner with little or no training. It is envisioned that the device 10, 62, 66 would be constructed in general accordance with FIG. 1 through FIG. 11b. The user would procure the device 10 in the first embodiment variation and/or the second embodiment variation.

After procurement and prior to utilization, the device 10, 62, 66 would be prepared in the following manner: The respective portable electronic device 20 would be secured in the by use of the adhesive 56, straps 57, or other means, such as by use of friction fit.

During utilization of the device 10, 62, 66 the following procedure would be initiated: a decision on the part of the user 35 would be made to utilize their portable electronic device 20 either in a glare-filled environment 90 such as outdoors, or in a crowded area where other could inadvertently view the screen of the portable electronic device 20; the side shield screens 25, 30 would be deployed; a desired one (1) of the long side shield screens 30 or short side shield screens 25 may be left in an outward position to allow hand/finger/thumb access of the user 35 to the portable electronic device 20; if present, the first long side shield screen 114 with the openings 116 that enable the hand/finger/thumb access of the user 35 to access the portable electronic device 20, and the portable electronic device 20 is used for viewing, picture taking, video taking, email reading or sending, text reading or sending, or the like; the screen brightness may be lowered to conserve battery capacity of the portable electronic device 20. In the case of usage on a horizontal surface 45, the stand assembly 92 or kickstand 93 may be deployed.

At the completion of use, the screen assembly 65 is removed in the case of the preferred embodiment 10, or alternately the side shield screens 25, 30 are folded inward in first travel path "a" 16 or outward in second travel path "a'" 17. In the case of the case cover embodiment 66 or the pocket cover embodiment 62, similarly the side shield screens 25, 30 are folded inward in first travel path "a" 16 or second travel path "a'" 17. The device 10, 62, 66 is stored until needed again to allow for use in a cyclical manner. Alternately, either embodiment 10, 62, 66, can be stored on the belt of a user 35 by the bi-directional belt loop system 145 or the clip 148.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:
1. A glare shield, comprising:
   a frame holder retaining a portable electronic device therein, said frame holder further comprising:
   a frame holder bottom wall;
   a frame holder sidewall extending vertically away from a perimeter top edge of said frame holder bottom wall;
   a plurality of frame holder side wall apertures each located on said frame holder sidewall aligned with a respective communication port or a control device of said portable electronic device; and,
   a frame holder bottom wall aperture located on said frame holder bottom wall aligned with a camera lens of said portable electronic device;
   a shield assembly removably attached over said frame holder, said shield assembly further comprising:
   a shield assembly top wall having a centrally located cut-out;
   a shield assembly sidewall extending vertically away from a perimeter bottom edge of said shield assembly top wall;
   a plurality of shield assembly side wall apertures each located on said shield assembly sidewall aligned with a respective frame holder sidewall and said communication port or a control device of said portable electronic device;
   a pair of long side shield screens hingedly attached to opposing sides of said shield assembly top wall opposite to said shield assembly sidewall, said pair of long side shield screens having a first means for attaching located at opposing side edges thereof; and,
   a pair of short side shield screens hingedly attached to opposing sides of said shield assembly top wall, opposite to said shield assembly sidewall, a pair of short side shield screens having a second means for attaching located at opposing side edges thereof;
   wherein said centrally located cut-out does not cover a screen of said portable electronic device;
   wherein each said pair of long side shield screens and said pair of short side shield screens independently travel relative to said shield assembly top wall;
   when said pair of long side shield screens and said pair of short side shield screens are fully deployed, said first means for attaching and said second means for attaching are removably attaching to each other to create a shield; and,
   when said pair of long side shield screens and said pair of short side shield screens are fully stowed, they cover said cut-out;
   at least one stand located on a rear surface of said frame holder bottom wall;
   a bi-directional belt loop system located on a rear surface of said frame holder bottom wall;
   a clip located on an outer surface of said bi-directional loop system;
   a first shield screen aperture located on a first short side shield screen adjacent said frame holder bottom wall aperture;
   a second shield screen aperture located on a first long side shield screen adjacent said frame holder bottom wall aperture; and,
   a third shield screen aperture located on a second long side shield screen adjacent said frame holder bottom wall aperture;
   wherein each said first shield screen aperture, said second shield screen aperture, and said third shield screen aperture have a shield tab opening or closing a respective aperture;
   wherein said first shield screen aperture, said second screen shield aperture, and said third screen shield aperture are aligning with said frame holder bottom wall aperture and said camera lens of said portable electronic device and are in aligned configuration, when said first long side shield screen and said second long side shield screen are manipulated towards said frame holder bottom wall;

wherein one of said pair of long side shield screens includes a pair of openings on opposing sides adjacent to said shield assembly top wall;

wherein said frame holder bottom wall includes a means for attaching a portable electronic device located on an inner surface thereof, retaining said portable electronic device therein.

2. A glare shield retaining a portable electronic device therein, comprising:

a frame holder bottom wall;

a frame holder sidewall extending vertically away from a perimeter top edge of said frame holder bottom wall;

a frame holder top wall extending away from a perimeter top edge of said frame holder sidewall, said frame holder top wall having a centrally located cut-out;

a plurality of frame holder side wall apertures each located on said frame holder sidewall aligned with a respective communication port or control device of said portable electronic device;

a frame holder bottom wall aperture located on said frame holder bottom wall aligned with a camera lens of said portable electronic device;

a pair of long side shield screens hingedly attached to opposing sides of said frame holder top wall opposite said frame holder sidewall, said pair of long side shield screens having a first means for attaching located at opposing side edges thereof; and, a pair of short side shield screens hingedly attached to opposing sides of said frame holder top wall opposite said frame holder sidewall, said pair of short side shield screens having a second means for attaching located at opposing side edges thereof;

a first shield screen aperture located on a first short side shield screen adjacent said frame holder bottom wall aperture;

a second shield screen aperture located on a first long side shield screen adjacent said frame holder bottom wall aperture; and, a third shield screen aperture located on a second long side shield screen adjacent said frame holder bottom wall aperture;

wherein said first shield screen aperture, said second screen shield aperture, and said third screen shield aperture are aligning with said frame holder bottom wall aperture and said camera lens of said portable electronic device and are in aligned configuration when said first short side shield screen, said first long side shield screen, and said second long side shield screen are manipulated towards said frame holder bottom wall;

at least one stand located on a rear surface of said frame holder bottom wall;

a bi-directional belt loop system located on a rear surface of said frame holder bottom wall;

a clip located on an outer surface of said bi-directional loop system;

wherein each said first shield screen aperture, said second shield screen aperture, and said third shield screen aperture have a shield tab opening or closing a respective aperture;

wherein said centrally located cut-out does not cover a screen of said portable electronic device;

wherein each said pair of long side shield screens and said pair of short side shield screens independently travel relative to said frame holder top wall;

when said pair of long side shield screens and said pair of short side shield screens are fully deployed, said first means for attaching and said second means for attaching are removably attached to each other to create a shield; and, when said pair of long side shield screens and said pair of short side shield screens are fully stowed and cover said cut-out.

3. The glare shield of claim 2, wherein one of said pair of long side shield screens includes a pair of openings on opposing sides, adjacent to said frame holder top wall.

4. The glare shield of claim 3, further comprising a means for attaching a portable electronic device located on an inner surface of said frame holder bottom wall, retaining said portable electronic device therein.

5. A glare shield, retaining a portable electronic device therein, comprising:

a frame holder bottom wall;

a frame holder sidewall extending vertically away from a perimeter top edge of said frame holder bottom wall, said frame holder sidewall further having a longitudinal slit;

a frame holder top wall extending away from a perimeter top edge of said frame holder sidewall, said frame holder top wall having a centrally located cut-out;

a plurality of frame holder side wall apertures each located on said frame holder sidewall aligned with a respective communication port or control device of said portable electronic device;

a frame holder bottom wall aperture located on said frame holder bottom wall aligned with a camera lens of said portable electronic device;

a pair of long side shield screens hingedly attached to opposing sides of said frame holder top wall opposite said frame holder sidewall, said pair of long side shield screens having a first attachment means located at opposing side edges thereof; and, a pair of short side shield screens hingedly attached to opposing sides of said frame holder top wall opposite said frame holder sidewall, said pair of short side shield screens having a second attachment means located at opposing side edges thereof;

at least one stand located on a rear surface of said frame holder bottom wall;

wherein said slit is enabling insertion and removal of said portable electronic device;

wherein said centrally located cut-out does not cover a screen of said portable electronic device;

wherein each said pair of long side shield screens and said pair of short side shield screens independently travel relative to said frame holder top wall;

when said pair of long side shield screens and said pair of short side shield screens are fully deployed, said first means for attaching and said second means for attaching are removably attaching to each other to create a shield; and, when said pair of long side shield screens and said pair of short side shield screens are fully stowed, they cover said cut-out.

6. The glare shield of claim 5, wherein one of said pair of long side shield screens comprises a pair of openings on opposing sides, adjacent to said frame holder top wall.

7. The glare shield of claim 5, comprising a means for attaching a portable electronic device located on an inner surface of said frame holder bottom wall, retaining said portable electronic device therein.

8. The glare shield of claim 5, comprising:
a first shield screen aperture located on a first short side shield screen adjacent said frame holder bottom wall aperture;
a second shield screen aperture located on a first long side shield screen adjacent said frame holder bottom wall aperture; and,
a third shield screen aperture located on a second long side shield screen adjacent said frame holder bottom wall aperture;
wherein said first shield screen aperture, said second screen shield aperture, and said third screen shield aperture are aligning with said frame holder bottom wall aperture and said camera lens of said portable electronic device and are in aligned configuration when said first short side shield screen, said first long side shield screen, and said second long side shield screen are manipulated towards said frame holder bottom wall.

9. The glare shield of claim 8, wherein each said first shield screen aperture, said second shield screen aperture, and said third shield screen aperture have a shield tab opening or closing a respective aperture.

10. The glare shield of claim 5, further comprising a bi-directional belt loop system located on a rear surface of said frame holder bottom wall.

11. The glare shield of claim 10, further comprising a clip located on an outer surface of said bi-directional loop system.

\* \* \* \* \*